(12) United States Patent
Pasternak

(10) Patent No.: US 7,440,107 B2
(45) Date of Patent: Oct. 21, 2008

(54) SAMPLING SPECTROPHOTOMETER COMPRISING AN INTERFEROMETER

(75) Inventor: Frédérick Pasternak, Gaure (FR)

(73) Assignee: Astrium SAS, Paris (FR)

( * ) Notice: Subject to any disclaimer, the term of this patent is extended or adjusted under 35 U.S.C. 154(b) by 77 days.

(21) Appl. No.: 11/564,466

(22) Filed: Nov. 29, 2006

(65) Prior Publication Data

US 2007/0127032 A1 Jun. 7, 2007

(30) Foreign Application Priority Data

Dec. 1, 2005 (FR) .................................. 05 12208

(51) Int. Cl.
*G01B 9/02* (2006.01)
*G01J 3/45* (2006.01)

(52) U.S. Cl. ...................................... 356/451
(58) Field of Classification Search ................. 356/319, 356/323, 324, 451, 456
See application file for complete search history.

(56) References Cited

U.S. PATENT DOCUMENTS

| | | | |
|---|---|---|---|
| 4,538,910 A | | 9/1985 | Doyle |
| 4,681,445 A | | 7/1987 | Perkins |
| 5,164,786 A | * | 11/1992 | Delhaye et al. ............. 356/326 |
| 6,351,307 B1 | | 2/2002 | Erskine |
| 6,963,405 B1 | * | 11/2005 | Wheel et al. ................. 356/456 |
| 7,170,610 B2 | * | 1/2007 | Knuttel ........................ 356/456 |

FOREIGN PATENT DOCUMENTS

EP 1 503 192 A1 2/2005

OTHER PUBLICATIONS

French Preliminary Search Report FR 0512208; report dated Aug. 31, 2006.

* cited by examiner

*Primary Examiner*—Michael A Lyons
(74) *Attorney, Agent, or Firm*—Miller, Matthias & Hull

(57) ABSTRACT

A sampling spectrophotometer comprising an interferometer is used for performing a spectral analysis of light produced by a source. The sampling is adapted for eliminating uncertainty in the frequencies that are associated with spectral components deduced from an interferogram. Preferably, the interferometer is of Michelson type, and is equipped with at least one staircase mirror in one of the two optical paths. Elementary reflecting strips of the staircase mirror can then be offset with respect to one another according to a variable step.

12 Claims, 2 Drawing Sheets

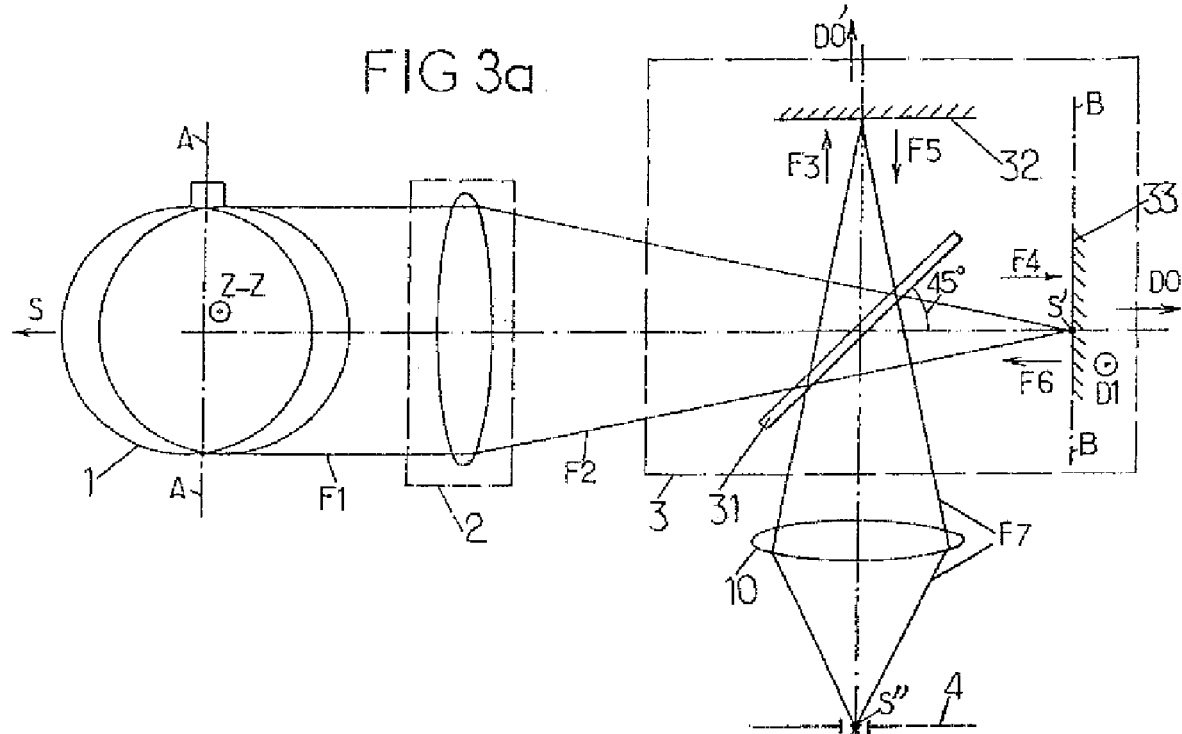
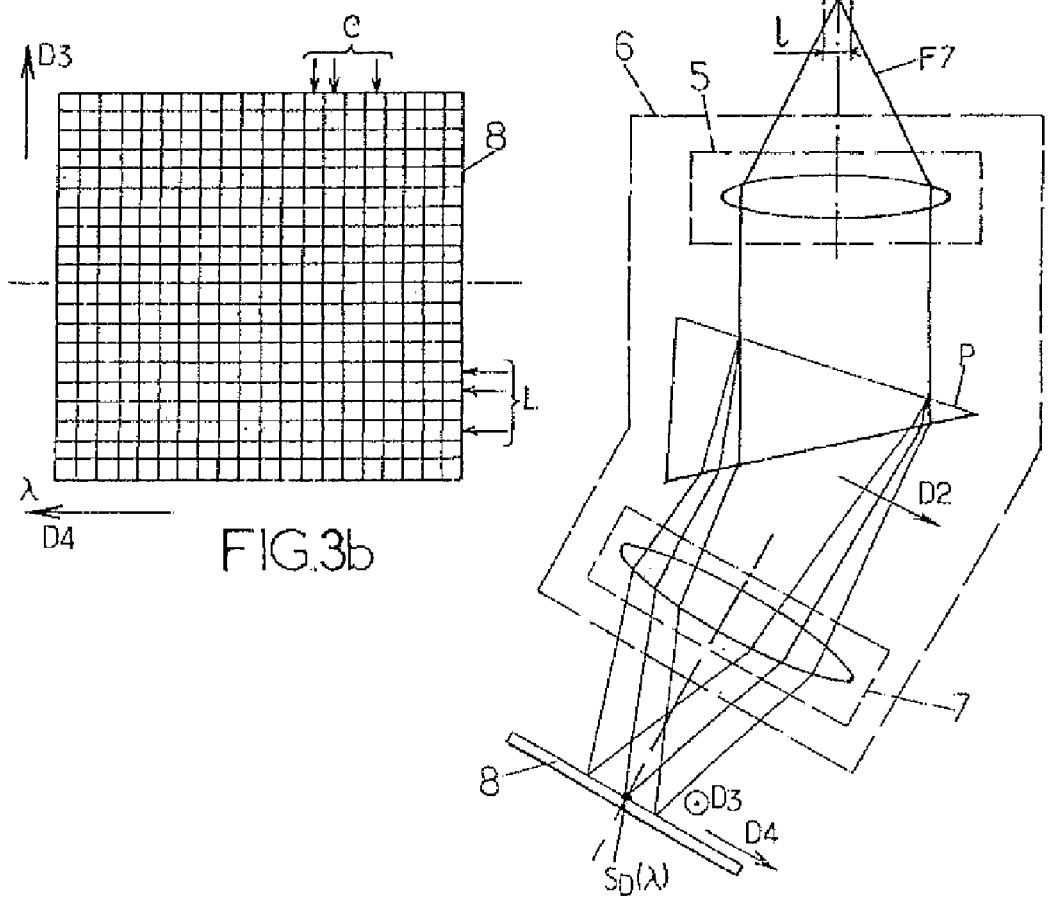

SAMPLING SPECTROPHOTOMETER COMPRISING AN INTERFEROMETER

FIELD OF THE DISCLOSURE

The present invention relates to a sampling spectrophotometer that comprises an interferometer, together with a method for spectral analysis of a light beam.

BACKGROUND OF THE DISCLOSURE

Spectrophotometers referred to as Fourier transform spectrophotometers are well known. Each of these instruments is essentially composed of an interferometer that produces an interferogram from a light beam directed into the entry of the instrument. Measurements of light intensity are recorded, which respectively correspond to fixed values of an optical path length difference. This optical path length difference exhibits identical spacings between two successive measurements in the interferogram. The spectral distribution of the light in the beam is then evaluated by calculating a Fourier transform of the measured intensities as a function of the values of the optical path length difference.

Now, the reduction of the interferogram to a limited sample of light intensity measurements leads to an uncertainty in the frequency to which a spectral component intensity, calculated by Fourier transform, corresponds. This problem is well known and is referred to as 'aliasing'. In order to eliminate this uncertainty, the interferometer is combined with a filter within the spectrophotometer, which filter selects a part of the light from the light beam. In this manner, the light producing the interferogram corresponds to a spectral interval which is determined by the filter. The frequencies to which the calculated spectral component intensities correspond then necessarily belong to this interval.

The filter has to be chosen as a function of the spectral interval of analysis: it must have a filtering window whose limits correspond to those of the analysis interval. But, a filter that corresponds to any given spectral interval is not always available. The limited variety of the available filters therefore leads to a constraint on the spectral interval within which a light beam may be analysed using a Fourier transform spectrophotometer. Such a constraint can be a problem, especially for measurements in space performed from a satellite, since the spectrophotometer filter cannot be easily changed.

An object of the present invention consists in eliminating the necessity for using a filter in order to perform spectrophotometric measurements by sampling of an interferogram.

SUMMARY OF THE DISCLOSURE

To this end, the invention provides a spectrophotometer which comprises an interferometer configured to produce, from a light beam entering this spectrophotometer, a sample of an interferogram according to fixed values of an optical path length difference. The values of the optical path length difference exhibit successive spacings that are variable and that are adapted so that a spectral distribution of the light in the beam can be evaluated from the following set of equations:

$$\sum_{k=1}^{k=N} A_k \times \cos(2\pi \times f_k \times \delta_i) = M_i \quad (1)$$

for each integer i from 1 to N, N being the number of light intensity measurements in the interferogram sample, and where $M_i$ is the i-th measurement of light intensity of the interferogram sample, $\delta_i$ is the value of the optical path length difference corresponding to the measurement $M_i$, $f_k$ is a mean frequency corresponding to a spectral component of the light in the beam, k being an integer from 1 to N allowing N different frequencies $f_k$ to be identified, and $A_k$ is a light intensity of the spectral component of the beam corresponding to the frequency $f_k$.

Thus, according to the invention, the spacings between the values of the optical path length difference corresponding to two successive measurements of light intensity in the interferogram are no longer identical. The spectral distribution of the light in the beam can now no longer be evaluated by Fourier transform, but it can be evaluated by solving the set of equations (1). This set of equations forms a system of N linear equations with N unknown values, which are the values $A_k$ of the intensities of the spectral components associated with the frequencies $f_k$. Such a system of equations can be solved very simply, in a known manner, by using calculation means that are simple and inexpensive.

Thanks to a suitable choice of the values $\delta_i$ of the optical path length differences, and specially because the spacings $\delta_{i+1}-\delta_i$ are not identical for different pairs of successive measurements $M_i$, $M_{i+1}$ of light intensity in the interferogram, no aliasing occurs in the identification of the frequencies $f_k$.

According to one preferred embodiment of the invention, the interferometer can comprise a Michelson apparatus. In this case, the various values of the optical path length difference can be produced simultaneously. All of the light intensities that form the sample of the interferogram can therefore be measured at the same time by using a linear array of photodetectors. Measurement time is saved as a result.

Furthermore, the Michelson apparatus can itself be equipped with a planar mirror and a staircase mirror, disposed so as to reflect respective parts of the light beam. In this case, the values of the optical path length difference can be fixed by the staircase mirror. These values can then be known precisely, which allows the spectral distribution of the beam to be evaluated more accurately. Alternatively, both mirrors of the Michelson apparatus can be staircase mirrors.

According to one improvement of the invention, the interferometer can form several interferograms corresponding to respective spectral intervals. The spectrophotometer can then also comprise a dispersing system arranged in such a manner as to spatially separate parts of the light from the beam which respectively correspond to the interferograms. Advantageously, the interferograms can be formed by respective sets of light intensity values which are measured parallel to a common interferogram direction, and the dispersing system is oriented so that a direction of dispersion of the latter is substantially perpendicular to the interferogram direction. For such a spectrophotometer, the spectral interval that corresponds to each of the interferograms can be deduced from information collected in the dispersion direction. Furthermore, the use of a matrix of photodetectors allows all the interferograms to be recorded simultaneously. The measurement time required for analysing a light beam is not therefore increased.

The invention also provides a method for the spectral analysis of a light beam that comprises the following steps:

producing an interferogram by directing the light beam into a spectrophotometer that comprises an interferometer, measuring a finite number of light intensities of the interferogram, so as to form a sample of the latter, the light intensity measurements corresponding to respective values of an optical path length difference exhibiting variable spacings;

identifying frequencies corresponding to respective spectral components of the light in the beam; and calculating respective intensities of the spectral components using the set of equations (1).

Such spectral analysis method can be implemented using a spectrophotometer such as previously described.

In particular, when the spectrophotometer incorporates a dispersing system in addition to the interferometer, the frequencies $f_k$ of the spectral components of the part of the light beam that forms one of the interferograms can be selected within a spectral interval deduced from the measurements. This interval is determined, for each interferogram, by the spectral resolution of the dispersing system and by the position of this interferogram which is determined by the dispersing system.

BRIEF DESCRIPTION OF DRAWINGS

Other features and advantages of the present invention will become apparent in the description hereinbelow of two non-limiting exemplary embodiments, with reference to the appended drawings, in which:

FIG. 3a is a schematic optical diagram of a spectrophotometer according to an improvement of the invention; and FIG. 3b shows a matrix of photodetectors that can be used in the spectrophotometer in FIG. 3a.

DETAILED DESCRIPTION

Figure 1:
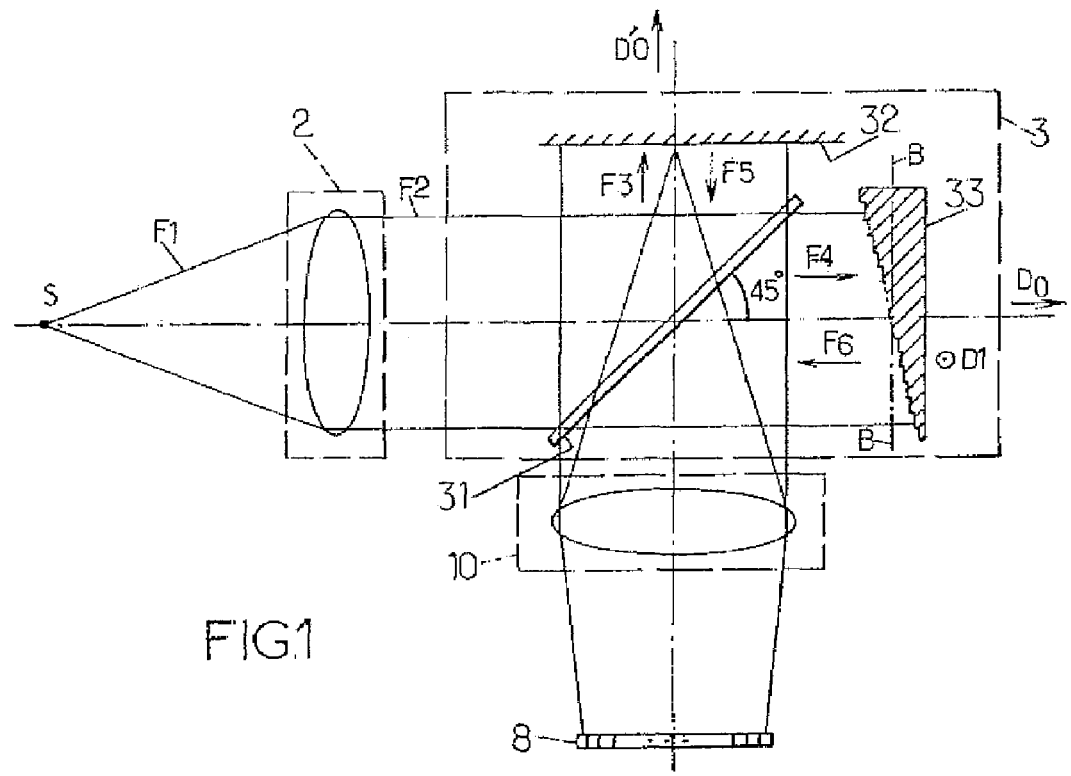
FIG. 1 is a schematic optical diagram of a spectrophotometer to which the invention may be applied.

FIGS. 1 and 3a illustrate different arrangements of optical elements within spectrophotometers according to two particular embodiments of the invention. For reasons of clarity, the dimensions of the optical elements shown in these figures and the distances between these elements are not in proportion with actual dimensions and distances. In addition, identical references in these figures denote identical elements, or which have identical functions. Lastly, in the following description, the optical elements known to those skilled in the art are not described in detail. Only indications are given concerning their use within the spectrophotometers described.

According to FIG. 1, a spectrophotometer comprises an optical entry 2, a Michelson interferometer, an intermediate optical assembly 10 and a linear array of photodetectors 8. In a known manner, the Michelson interferometer itself comprises:

a device 31 for separating, by intensity division, a primary beam F2 entering the interferometer into two secondary beams F3 and F4 having respective propagation directions D0' and D0 D0 can be the entry direction of the primary beam F2 into the interferometer 3, and D0' is made conjugate with the direction D0 by the separation device 31. The separation device 31 may comprise, for example, a planar semi-transparent mirror disposed in a plane rotated by 45 degrees with respect to direction D0, about a direction D1 perpendicular to the latter;

two mirrors 32 and 33 disposed so as to respectively reflect the secondary beams F3 and F4, in order to form first and second reflected secondary beams F5 and F6; and a recombination device, disposed so as to recombine the reflected secondary beams F5 and F6, and form a recombined beam F7 exiting the interferometer 3. In a known manner for interferometers of the Michelson type, the separation device 31 also serves the function of recombining the reflected secondary beams F5 and F6.

In FIG. 1, for reasons of clarity, the beams F3-F6 are only represented by their respective directions of propagation.

The entry optical assembly 2 is disposed in front of the entry of the interferometer 3 so as to form the primary beam F2 from an entry beam F1. Beam F1 is produced by a light source S, which is to undergo spectral analysis. The entry optical assembly 2 is adjusted so that the primary beam F2 exhibits a substantially parallel beam configuration.

The linear array of photodetectors 8 is disposed parallel to direction D0, at the exit of the interferometer 3.

The intermediate optical assembly 10 is disposed between the interferometer 3 and the linear array of photodetectors 8, in order to form an image of the mirrors 32 and 33 on the latter.

Under these conditions, the interferometer 3 produces an interferogram of the light produced by the source S. This interferogram is formed on the linear array of photodetectors 8, so that it can be recorded.

The mirror 32 is a planar mirror disposed perpendicularly to direction D0', and the mirror 33 is a staircase mirror. The mirror 33 is formed from elementary faces perpendicular to direction D0, in the form of planar reflecting strips aligned parallel to direction D1, and placed adjacently along an axis B-B perpendicular to the directions D0 and D1. The elementary faces of the mirror 33 are offset with respect to one another along direction D0.

This offsetting of the elementary faces of the mirror 33 creates a variation in the difference between the lengths of the optical paths that are followed by two parts of the same light ray of the primary beam F2, separated by the device 31. These light ray parts belong, respectively, to the secondary beams F3 and F4, and are each reflected by the mirror 32 or 33. The reflected ray parts belong to the reflected secondary beams F5 and F6, and are recombined by the device 31 into the beam F7. The beam F7 therefore corresponds to an interference of the reflected secondary beams F5 and F6. The difference between the lengths of the optical paths followed by the two light ray parts depends on the position of the reflection point of each of them on the mirrors 32 and 33. This difference depends, more precisely, on the location of the reflection point of the beam F4 measured along the axis B-B.

The intermediate optical assembly 10 is also arranged so that the image of each elementary face of the staircase mirror 33 has a width equal to the dimension of the photodetectors of the linear array 8 along direction D0. Each elementary face of the mirror 33 is then conjugate with a photodetector. In this case, the number of photodetectors in the linear array 8 is preferably at least equal to the number N of elementary faces of the mirror 33. N can, for example, be equal to 128.

The mirrors 32 and 33 can also both be of the staircase type. In this case, the optical path length difference results from the offsetting of the elementary faces of the two mirrors. In particular, they can be configured so that the elementary optical faces of each of the two mirrors are respectively optically conjugate with those of the other mirror by the separation device 31.

Figure 2A:
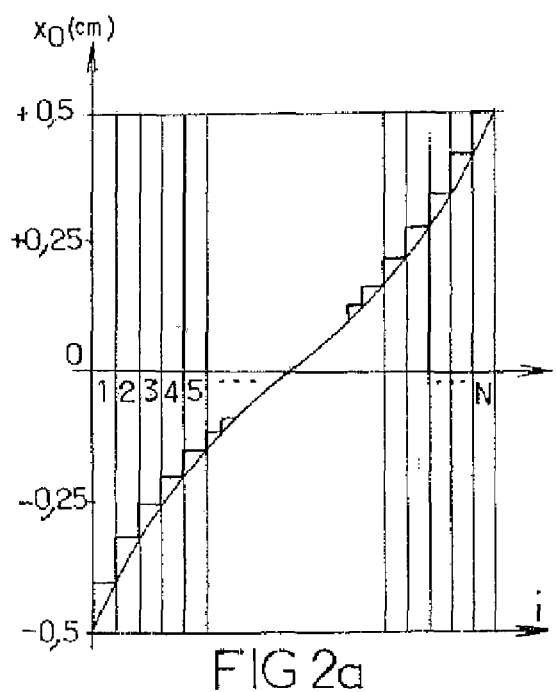
FIGS. 2a and 2b are diagrams characterizing a staircase mirror that can be used in the spectrophotometer in FIG. 1.

FIG. 2a is a diagram that indicates the position of each elementary face of the staircase mirror 33 along direction D0. The horizontal axis plots the number i of the elementary faces of the mirror 33, i going from 1 to N, and the ordinate axis indicates the position of each face, denoted as $x_0$ and expressed in centimetres. The height of the steps displayed by the diagram in FIG. 2a corresponds to the successive offsets between is the elementary faces of the mirror 33. It is assumed that the centre of the mirror 33 corresponds to the optical contact with the mirror 32. The optical path length difference that is associated with the face i of the mirror 33, and therefore the light intensity measured by the i-th photodetector of the linear array 8, is then equal to twice the absolute value of the corresponding value of $x_0$, read on the diagram in FIG. 2a. Put another way: $\delta_i = 2x_0$.

Figure 2B:
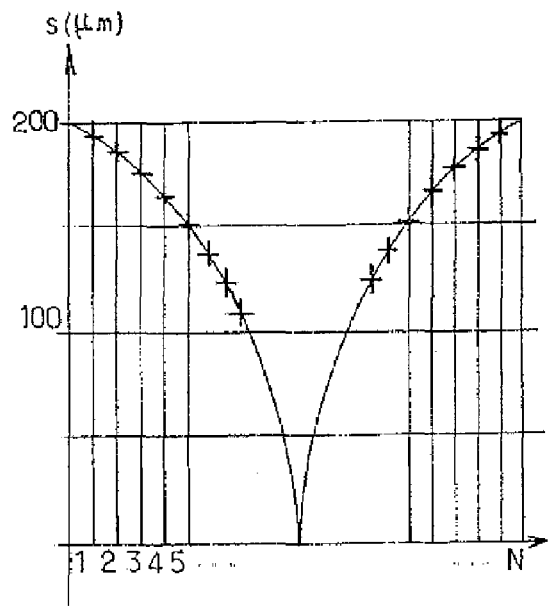

FIG. 2b corresponds to FIG. 2a and indicates the spacing between the optical path length differences corresponding to two successive photodetectors along the linear array 8. This spacing is denoted as s. In other words, $s(i) = \delta_i - \delta_{i-1}$, for i varying from 2 to N. The spacings s, expressed in micrometres and in absolute value, are plotted as the ordinate. FIG. 2b illustrates variations of the successive spacings s which are symmetrical on either side of the median of the mirror parallel to the direction D1. Such symmetry makes it possible for a relative offset of the two mirrors 32 and 33 to be digitally corrected with respect to a condition of optical contact made at the centre of the mirror 33.

The inventors have observed that a staircase mirror 33 such as characterized by FIGS. 2a and 2b makes it possible for the values of spectral intensity $A_k$ to be calculated with high precision. These spectral intensity values are obtained by solving the system of equations (1). Frequencies $f_k$ are chosen within a detection interval of the spectrophotometer, which may be determined by the sensitivity of the photodetectors, or by a light filter (not shown) disposed at the entry of the spectrophotometer. In particular, the determinant of the system of equations (1), which has the value of $\cos(2\Pi \times f_k \times \delta_i)$ as a coefficient at the i-th line and at the k-th column, is not zero.

It should be pointed out that the order of the elementary reflecting strips of the staircase mirror 33 is unimportant, in a first approach of the invention. In other words, the positions $x_0$ of the strips of the mirror 33 can be exchanged with respect to one juxtaposition order of the strips, without the result of the spectral distribution that is obtained be modified. When spurious phenomena are taken into account, such as shadowing effects of the strips of the staircase mirror or interference effects, it may be advantageous to reverse the offsetting of the strips of the staircase mirror with respect to that shown in the diagram 2a.

FIG. 3a illustrates an improvement of the invention, according to which an indication of the interval of the frequencies $f_k$ which correspond to spectral components of each interferogram is simultaneously obtained.

The interferometer 3 which is used for this improved version is of the type previously described, in which the staircase mirror 33 is rotated by 90 degrees about direction D0. Direction D1 therefore becomes the direction of variation of the optical path length difference.

Furthermore, the distance between the interferometer 3 and the entry optical assembly 2 is adjusted so that an image S' of the source S is formed inside the interferometer 3, substantially at the level of the mirrors 32 and 33. The image S' then corresponds to the reflection point of the secondary beam F4 on the mirror 33.

According to the configuration shown in FIG. 3a, the source S is situated far away from the spectrophotometer. So, only the direction in which the source S is situated is shown in the figure. In the jargon of those skilled in the art, the source S is said to be "situated at infinity". Such a configuration corresponds, for example, to a space or terrestrial observation which may be performed from a satellite. The spectrophotometer is then mounted onboard the satellite and the entry optical assembly 2 can be a telescope optical assembly.

According to the improved version, the spectrophotometer also comprises a dispersing system 6 which is inserted between the intermediate optical assembly 10 and the photodetectors, The dispersing system 6 is disposed so as to receive at its entry the beam F7, referred to as intermediate beam in this case. It can comprise a collimating optical assembly 5, a prism P and a focussing optical assembly 7, which are arranged so that the light of the intermediate beam F7 passes successively through the collimating optical assembly 5, the prism P, then the focussing optical assembly 7. In FIG. 3a, the optical assemblies 5 and 7 are represented symbolically by lenses, but they may each be formed from a complex optical assembly. The collimating optical assembly 5 is for example configured so as to transform the intermediate beam F7 into a parallel beam passing through the prism P. The focussing optical assembly 7 is configured in order to form a final image $S_D(\lambda)$ of the source S in a plane conjugate with the mirror 32. The prism P causes the light from the intermediate beam F7 to be angularly dispersed in a direction D2 substantially perpendicular to the direction of propagation of the light. A set of images $S_D(\lambda)$ corresponding to different dispersed wavelengths $\lambda$ are thus formed simultaneously. The images $S_D(\lambda)$ are offset with respect to one another along a direction D4 conjugate with the dispersion direction D2 by the focussing optical assembly 7.

In a known manner, the prism P may be replaced by a diffraction grating, without changing the operation of the spectrophotometer.

The interferometer 3 and the dispersing system 6 are oriented with respect to one another so that the dispersion direction D2 is substantially perpendicular to the direction D1 of variation of the optical path length difference.

The linear array of photodetectors is replaced by a planar matrix of photodetectors 8, such as is shown in FIG. 3b. The matrix 8 is formed by photodetectors arranged in columns C and in rows L perpendicular to the columns. The columns C are parallel to a direction D3 and the rows of the matrix 8 are parallel to the direction D4. The direction D4 is consequently the direction in which the columns C of the matrix 8 are offset with respect to one another. The matrix of photodetectors 8 is disposed in a plane conjugate with the mirror 32 that contains the images $S_D(\lambda)$. Consequently, a spectrophotometer of the type being considered in the present improved version of the invention plays an imaging role: it produces, on the matrix of photodetectors 8, an image of each source S that is situated within the field of entry of the spectrophotometer.

Within the spectrophotometer, the matrix of photodetectors 8 is therefore oriented so that direction D3 of the columns C is conjugate with the direction D1 of variation of the optical path length difference. In the case of a system such as shown in FIG. 3a, direction D3 is parallel to direction D1. Direction D4 then corresponds to the dispersion direction D2. By suitably choosing the magnification of the intermediate optical assembly 10, the rows L of the matrix 8 are now optically conjugate, one to one, with the elementary reflecting faces of the mirror 33.

The intermediate optical assembly 10 is furthermore placed in the path of the intermediate beam F7 so as to produce an intermediate image S" of the source S. A rectangular slit 4 is disposed at the position of the image S", in a plane substantially perpendicular to the direction of propagation of the intermediate beam F7. The slit 4 has its large dimension parallel to direction D1 and its width 1 parallel to direction D0. In a known manner, the slit 4 operates as an entry slit for the dispersing system 6, and each column of photodetectors C of the matrix 8 has a function of exit slit for the dispersing system 6.

Lastly, and optionally, a two-axis optical scanning device 1 can additionally be disposed in the path of the entry beam F1. The first axis of rotation of the scanning device 1 is perpendicular to the directions D0 and D0', and is denoted as Z-Z. The second axis of rotation of the device 1, denoted as A-A, is perpendicular to the axis Z-Z and can rotate about the latter. An entry opening of the scanning device 1 now sweeps an observation field within which the light source S is situated, in such a manner that the entry beam F1 has, at the output of the scanning device 1, a direction of propagation that is fixed with respect to the spectrophotometer and substantially parallel to the direction D0. When the scanning device 1 rotates about the axis Z-Z, the image S' of the source S moves in a direction parallel to the axis B-B. When the scanning device 1 rotates about the axis A-A, the image S' of the source S moves in a direction parallel to the direction D1.

The operation of such spectrophotometer is now described. Images $S_D(\lambda_m)$ of the same light source S are formed on each column C of the matrix of photodetectors 8. The dispersed wavelength $\lambda_m$ is defined by the offset along direction D4 of the column C being considered. It is actually a mean value which substantially corresponds to the position of the middle of the column C being considered, along direction D4.

Simultaneously, when the scanning device 1 rotates about the axis A-A, the photodetectors of each column C of the matrix 8, parallel to direction D3, record an interferogram of the light in the entry beam F1. For each of these interferograms, an accurate evaluation of the spectral distribution of energy within an interval centred around the corresponding mean wavelength $\lambda_m$ can be calculated. It is calculated by solving a system of equations of the type (1) associated with each of the columns C of the matrix 8, which is obtained from the light energies received by the photodetectors of this column C. For each of the interferograms, the wavelengths $\lambda_k$ are distributed around the mean wavelength $\lambda_m$ of the corresponding column C, with a difference relative to the latter that is limited by the spectral resolution of the dispersing system 6 along direction D4.

Although the invention has been described using an intermediate optical assembly 10 disposed at the exit of the interferometer 3, such an intermediate optical assembly is not compulsory for the implementation of the invention. It can therefore be suppressed, in particular for obtaining a lighter and more compact spectrophotometer. In this case, the slit 4 is disposed within the interferometer 3, for example on the mirrors 32 and/or 33.

Lastly, although the invention has been described in detail for spectrophotometers constructed using a Michelson interferometer, it will be understood that it can be applied to a spectrophotometer that comprises an interferometer of another type. For this purpose, it suffices that the interferometer be designed to produce at least one interferogram sampled according to a variable step in an optical path length difference.

The invention claimed is:

1. A spectrophotometer comprising an interferometer configured to produce, from a light beam entering said spectrophotometer, a sample of an interferogram according to fixed values of an optical path length difference, wherein said values of optical path length difference exhibit variable successive spacings that are adapted so that a spectral distribution of the light in the beam is evaluated from the following set of equations:

$$\sum_{k=1}^{k=N} A_k \times \cos(2\pi \times f_k \times \delta_i) = M_i$$

for each integer i from 1 to N, N being the number of light intensity measurements in the interferogram sample, and where
 $M_i$ is the i-th measurement of light intensity of the interferogram sample,
 $\delta_i$ is the value of the optical path length difference corresponding to the measurement $M_i$,
 $f_k$ is a mean frequency corresponding to a spectral component of the light in the beam, k being an integer from 1 to N making it possible to identify N different frequencies $f_k$, and
 $A_k$ is an intensity of the spectral component of the beam corresponding to the frequency $f_k$.

2. The spectrophotometer according to claim 1, wherein the interferometer comprises a Michelson apparatus.

3. The spectrophotometer according to claim 2, wherein the Michelson apparatus is equipped with a planar mirror and a staircase mirror disposed so as to reflect respective parts of the light beam, the values of optical path length difference being determined by the staircase mirror.

4. The spectrophotometer according to claim 2, wherein the Michelson apparatus is equipped with two staircase mirrors disposed so as to reflect respective parts of the light beam.

5. The spectrophotometer according to claim 1, wherein the interferometer produces several interferograms corresponding to respective spectral intervals, the spectrophotometer also comprising a dispersing system arranged in such a manner as to spatially separate parts of the beam corresponding to the interferograms.

6. The spectrophotometer according to claim 5, wherein the interferograms are formed by respective sets of light intensity values measured parallel to a common interferogram direction, and wherein the dispersing system is oriented such that a direction of dispersion of said system is substantially perpendicular to the interferogram direction.

7. A method for spectral analysis of a light beam comprising the following steps:
 producing an interferogram by directing said beam into a spectrophotometer comprising an interferometer,
 measuring a finite number of light intensities of the interferogram, so as to form a sample of said interferogram, said light intensity measurements corresponding to respective values of an optical path length difference exhibiting variable spacings;
 identifying frequencies corresponding to respective spectral components of the light in said beam; and
 calculating respective intensities of the spectral components using the following set of equations:

$$\sum_{k=1}^{k=N} A_k \times \cos(2\pi \times f_k \times \delta_i) = M_i$$

for each integer i from 1 to N, N being the number of light intensity measurements in the interferogram sample, and where $M_i$ is the i-th measurement of light intensity of the interferogram sample, $\delta_i$ is the value of the optical path length difference corresponding to the measurement $M_i$, $f_k$ is one of the identified frequencies corresponding to a spectral component of the light in the beam, k being an integer from 1 to N allowing N different frequencies $f_k$ to be identified, and $A_k$ is the intensity calculated for the spectral component corresponding to the frequency $f_k$.

8. The method according to claim 7, wherein the interferogram is produced using a Michelson apparatus.

9. The method according to claim 8, wherein the Michelson apparatus is equipped with a planar mirror and a staircase mirror disposed so as to reflect respective parts of the light beam, the values of optical path length difference being determined by the staircase mirror.

10. The method according to claim 8, wherein the Michelson apparatus is equipped with two staircase mirrors disposed so as to reflect respective parts of the light beam.

11. The method according to claim 7, implemented using a spectrophotometer according to claim 5.

12. The method according to claim 11, wherein the frequencies $f_k$ of the spectral components of a part of the light beam forming one of the interferograms are selected within a spectral interval determined by a spectral resolution of the dispersing system and by a position of said interferogram determined by the dispersing system.

* * * * *